United States Patent [19]

Yamashiro

[11] Patent Number: 5,468,279
[45] Date of Patent: Nov. 21, 1995

[54] METHOD FOR WATER-GRANULATING CALCIUM FERRITE SLAG

[75] Inventor: Akiyoshi Yamashiro, Kagawa, Japan

[73] Assignee: Mitsubishi Materials Corporation, Tokyo, Japan

[21] Appl. No.: 308,519

[22] Filed: Sep. 19, 1994

[51] Int. Cl.$^6$ .................................................. C22B 7/04
[52] U.S. Cl. .................................................. 75/640; 65/19
[58] Field of Search ................................ 65/19; 75/640

[56] References Cited

U.S. PATENT DOCUMENTS 4,909,837  3/1990  Hansen et al. ........................ 65/19

FOREIGN PATENT DOCUMENTS 4-302994  10/1992  Japan .

Primary Examiner—Melvyn Andrews
Attorney, Agent, or Firm—Oblon, Spivak, McClelland, Maier & Neustadt

[57] ABSTRACT

A method is disclosed for water-granulating calcium ferrite slag which is produced in copper converting processing and contains 10 to 30 weight % of CaO. In the method, water is caused to flow at a flow velocity of 7 to 25 m/sec, and the calcium ferrite slag is introduced into the water flow such that weight ratio of water to slag amounts to no less than 100. With this method, the occurrence of phreatic explosions can be effectively avoided.

4 Claims, 2 Drawing Sheets

METHOD FOR WATER-GRANULATING CALCIUM FERRITE SLAG

BACKGROUND OF THE INVENTION

1. Field of the Invention

The present invention pertains to a novel method for water-granulating calcium ferrite slag produced during copper converting operation.

2. Related Art

In the copper smelting process, high-temperature silicate slag, which may contain, as principal components, 35–40 weight % of FeO, 30–35 weight % of $SiO_2$, and 3–7 weight % of CaO, is produced in a smelting furnace, while high-temperature calcium ferrite slag (calcium-based slag), which may contain, as principal components, 45–65 weight % of $Fe_3O_4$, 10–30 weight % of CaO and 10–35 weight % of $Cu_2O$, is produced in a converting furnace. The both types of slag are shattered into granules by bringing them into contact with a large amount of water to effect rapid quenching. This operation is, in general, called "water-granulation" or "granulation".

FIGS. 1 and 2 depict a typical granulation apparatus used for water-granulating the aforesaid slag. The granulation apparatus includes a discharging launder 1 for discharging slag; a receiving launder 2 arranged below the downstream end 1a of the discharging launder 1 so as to extend in a discharging direction of the slag as indicated by the arrow P in FIG. 1; and a water-jetting device 3 for jetting granulating water towards the slag, being discharged from the discharging launder 1 to the receiving launder 2. The water-jetting device 3 is constructed to have a large number of elongated water outlets 3a (see FIG. 2), a water-supplying tubular member 3b connected to the outlets in fluid communication therewith, and a water conduit 3c connected to the tubular member 3b at its lateral side so as to be in fluid communication therewith.

Conventionally, the water-granulation of the silicate slag has been carried out using the aforesaid granulation apparatus in a relatively satisfactory manner. The water-granulation of the calcium ferrite slag has been also carried out by the same apparatus, but has been very difficult. For example, when the operational conditions similar to those of the water-granulation of the silicate slag are adopted for the water-granulation of calcium ferrite slag, phreatic explosions have frequently occurred.

SUMMARY OF THE INVENTION

It is therefore the object of the present invention to provide a water-granulation method for calcium ferrite slag, by which phreatic explosions during the granulation can be substantially obviated.

According to the invention, there is provided a method for water-granulating calcium ferrite slag which is produced in a copper converting process and contains 10 to 30 weight % of CaO, comprising the steps of:

causing water to flow at a flow velocity of 7 to 25 m/sec; and introducing the calcium ferrite slag into the flow of water such that the weight ratio of water to slag amounts to no less than 100.

With these procedures, the occurrence of phreatic explosions during the water-granulation can be substantially avoided. However, if either of the flow velocity or the weight ratio of water to slag falls outside the numerical ranges as specified herein, phreatic explosions frequently occur.

In the foregoing, the water-granulation apparatus to be used for carrying out the aforesaid method may be of an arbitrary structure, and is not restricted to the conventional apparatus as explained above.

DESCRIPTION OF THE PREFERRED EMBODIMENTS OF THE INVENTION

Figure 1:
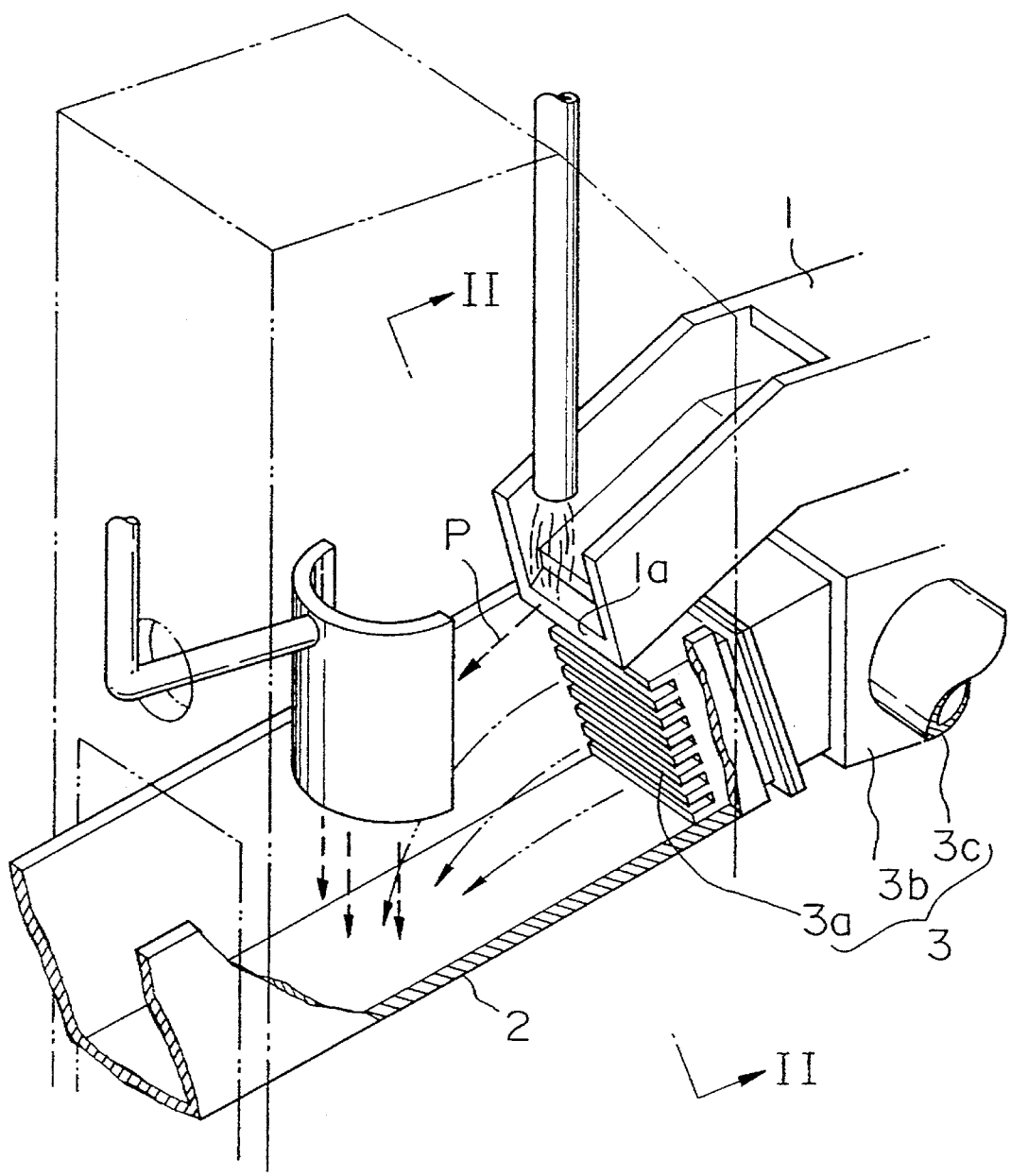
FIG. 1 is a partially cut-away perspective view of a conventional water-granulation apparatus of slag.
Figure 2:
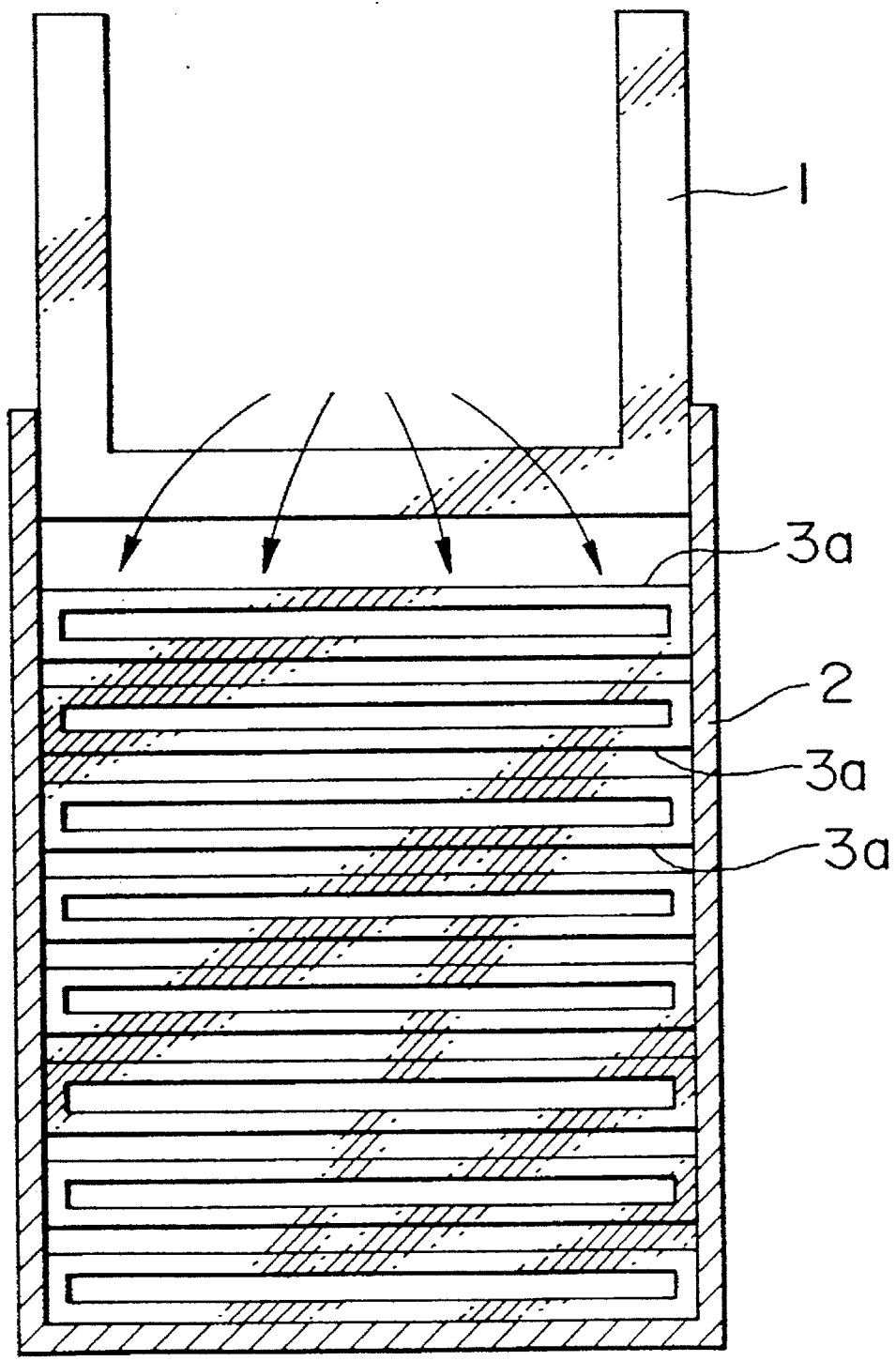
FIG. 2 is a schematic transverse cross-sectional view of the apparatus of FIG. 1, taken along the line II—II in FIG. 1.

A water-granulation method for calcium ferrite slag in accordance with the present invention will be explained in detail. In the water-granulation of calcium ferrite slag, the granulation apparatus as shown in FIGS. 1 and 2 may be employed, although granulation apparatuses of other constructions could be used as well. In the granulation process, granulating water is supplied into the water outlets 3a via the conduit 3c and the tubular member 3b. The granulating water thus supplied is jetted out from the water outlets 3a in a direction in which the receiving launder 2 extends. Furthermore, the high temperature calcium ferrite slag is discharged from the discharging end 1a of the discharging launder 1 and is introduced into the water flow being jetted out the water outlets 3a. Thus, the calcium ferrite slag contacts the water, and is rapidly quenched and water-granulated.

In the granulation method of the present invention, the granulating water is caused to flow at a flow velocity ranging from 7 to 25 m/sec, and the calcium ferrite slag is introduced into the water flow such that the weight ratio of water to slag amounts to no less than 100. In the foregoing, the "flow velocity" is not an actual flow velocity, but an apparent velocity obtained by dividing the flow rate of the granulating water by the cross-sectional area of the water outlets When the water-granulation is carried out under these conditions, phreatic explosions during the water-granulation can be substantially obviated. However, if either of the flow velocity or the weight ratio of water to slag is set so as to fall outside the aforesaid ranges, phreatic explosions frequently occur, although the mechanism of the occurrence is not known.

In the foregoing, it is preferable that the flow velocity of water range from 10 to 15 m/sec, while the weight ratio of water to slag be no less than 200. If the flow velocity exceeds 15 m/sec, the facilities located downstream will be subjected to increased wear. On the other hand, if the flow velocity is less than 10 m/sec and the weight ratio of water to slag is less than 200, considerably large lumps of slag may be produced. Furthermore, it is preferable that the weight ratio of water to slag be less than 400 simply because the design of apparatuses for allowing a great weight ratio exceeding 400 is not practical on a commercial and industrial basis.

Next, the water-granulation method of calcium ferrite slag in accordance with the present invention will be explained in more detail by way of example.

EXAMPLE

The water-granulation was carried out using water-granulation apparatuses having a basic construction as depicted in FIGS. 1 and 2. First, the granulating water was supplied into the conduits 3c so as to be jetted out from the water outlets 3a into the receiving launder 2, at a variety of predetermined flow velocities: 5, 7, 10, 15, 20, 25, 27, and 30 m/sec. The alteration of the flow velocity was carried out by changing the construction of water outlets 3a. Furthermore, the amount of the calcium ferrite slag to flow out from the discharging launder 1 was also varied to attain various weight ratios of water to slag: 30, 90, 100, 200, 300 and 400. Thus, the water granulation was carried out for various combinations of the flow velocities and slag/water weight ratios, and the number of phreatic explosions which occurred per day was observed for each respective condition. The results are set forth in Table 1.

As may be easily seen from Table 1, when the granulating water was caused to flow at a flow velocity ranging from 7 to 25 m/sec, and when the calcium ferrite slag was introduced into the water flow such that the weight ratio of water to slag amounted to no less than 100, no phreatic explosions were observed. However, when either of the flow velocity or the weight ratio of water to slag was set outside the aforesaid ranges, phreatic explosions occurred. In particular, even though the amount of water was increased, if the water velocity exceeded 25 m/sec, phreatic explosions occurred.

TABLE 1

| Flow Velocity (m/sec) | Water/Slag Ratio | Occurrences of Explosions (times) |
|---|---|---|
| 5* | 30* | 5 |
|  | 90* | 4 |
|  | 100* | 4 |
|  | 200* | 2 |
|  | 300* | 1 |
|  | 400* | 1 |
| 7 | 30* | 4 |
|  | 90* | 3 |
|  | 100 | none |
|  | 200 | none |
|  | 300 | none |
|  | 400 | none |
| 10 | 30* | 4 |
|  | 90* | 2 |
|  | 100 | none |
|  | 200 | none |
|  | 300 | none |
|  | 400 | none |
| 15 | 30* | 4 |
|  | 90* | 2 |
|  | 100 | none |
|  | 200 | none |

TABLE 1-continued

| Flow Velocity (m/sec) | Water/Slag Ratio | Occurrences of Explosions (times) |
|---|---|---|
|  | 300 | none |
|  | 400 | none |
| 25 | 30* | 5 |
|  | 90* | 4 |
|  | 100 | none |
|  | 200 | none |
|  | 300 | none |
|  | 400 | none |
| 27* | 30* | 6 |
|  | 90* | 5 |
|  | 100* | 5 |
|  | 200* | 3 |
|  | 300* | 2 |
|  | 400* | 1 |
| 30* | 30* | 7 |
|  | 90* | 6 |
|  | 100* | 5 |
|  | 200* | 3 |
|  | 300* | 2 |
|  | 400* | 1 |

(Note: the symbol "*" denotes a value falling outside the claimed range of the invention)

What is claimed is:

1. A method for water-granulating calcium ferrite slag which is produced in copper converting processing and which contains 10 to 30 weight % of CaO, comprising the steps of:

causing water to flow at a flow velocity of 7 to 25 m/sec; and introducing the calcium ferrite slag into said flow of water such that the weight ratio of water to slag amounts to no less than 100.

2. A method for water-granulating calcium ferrite slag according to claim 1, wherein the calcium ferrite slag is introduced into the water flow at the weight ratio of water to slag of 100 to 400.

3. A method for water-granulating calcium ferrite slag according to claim 1, wherein said flow velocity is 10 to 15 m/sec.

4. A method for water-granulating calcium ferrite slag according to claim 1, wherein the calcium ferrite slag is introduced into the water flow at the weight ratio of water to slag of no less than 200.

* * * * *